July 20, 1954     J. B. BUCKMAN     2,684,138

POWER TRANSMISSION

Filed May 13, 1950

INVENTOR.
JOHN B. BUCKMAN
BY
ATTORNEY

Patented July 20, 1954

2,684,138

UNITED STATES PATENT OFFICE 2,684,138

POWER TRANSMISSION

John B. Buckman, Ferguson, Mo., assignor to Vickers Incorporated, Detroit, Mich., a corporation of Michigan Application May 13, 1950, Serial No. 161,885

7 Claims. (Cl. 192—21.5)

This invention relates to magnetic couplings, and more particularly to magnetic couplings employing magnetic particles to transmit torque.

Magnetic couplings of the type considered herein cover that class of machinery which includes clutches and brakes, etc. generally formed from a pair of relatively rotatable magnetic members having an air gap therebetween more or less filled with magnetic particles with or without either wet or dry lubricants, torque being transmitted between the members by setting up a magnetic field linking the members and the magnetic particles. In such clutches of the stationary coil type, the coil or magnetizing element for setting up the operating magnetic field is separate from either of the movable members, that is, it is unattached to either the driving or driven member. One of the movable members, either the driving or the driven member, generally surrounds the other to form a confined sealed space to retain the mixture of magnetic particles. The fixed magnetizing element, usually a coil, is normally disposed adjacent to and on the outside of the outer movable member with a small air gap therebetween.

In order that the magnetic circuit traverses a magnetic portion of the inner movable member, the necessary two branches of the magnetic circuit, leading away from one and returning to the other of the respective opposite poles of the magnetizing element, are linked to the inner member through two magnetic belts on the outer member, which belts are separated by an insulating member of non-magnetic material. The necessity of the insulating non-magnetic element between two magnetic portions of one of the movable members introduces difficulties of design and increases manufacturing costs and problems.

This invention contemplates a movable magnetic coupling member adjacent to a stationary magnetizing element, the movable member having a unitary magnetic construction, specifically, the form of a saturable bridge interposed between the poles of the magnetizing element and the other movable member.

It is therefore an object of this invention to provide a new and useful magnetic coupling device.

It is another object of this invention to provide a new and useful magnetic coupling device having a magnetizing element separate from the movable coupling members, one of the coupling members interposing a saturable magnetic bridge between the magnetizing elements and the other coupling member.

Further objects and advantages of the present invention will be apparent from the following description, reference being had to the accompanying drawing wherein a preferred form of the present invention is clearly shown.

Figure 1:
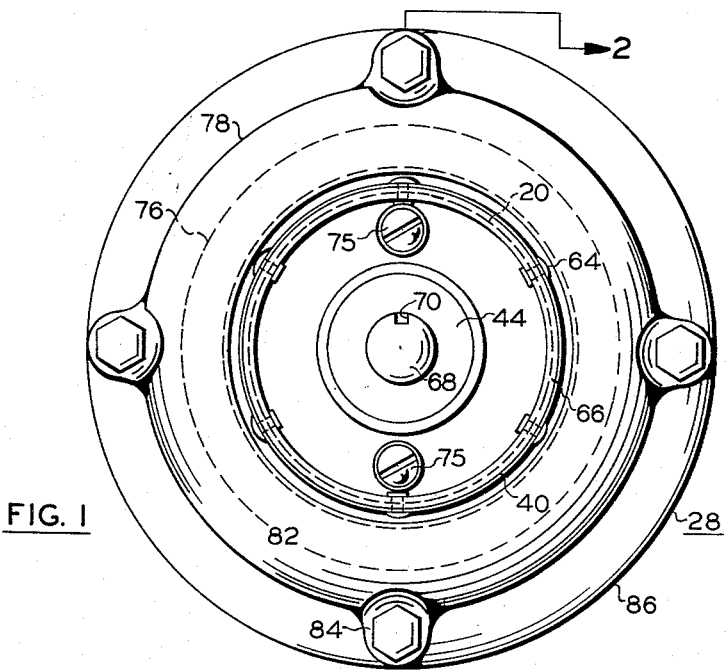
Figure 1 is an end view of a magnetic clutch embodying features of the invention.
Figure 2:
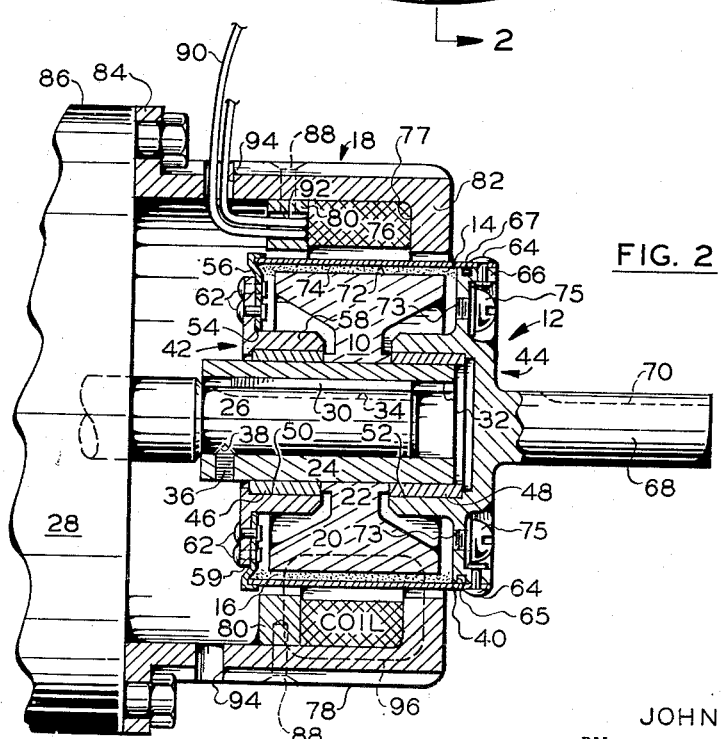
Figure 2 is a sectional view of the clutch shown in Figure 1, the section being taken on the line 2—2 of Figure 1.

The magnetic clutch, shown in the drawing, includes four major components, a driving member 10, a driven member 12, particles of magnetic material 14 in a magnetic working gap 16 between the driving and driven members, and a fixed magnetizing element 18. The driving member 10, which is completely enclosed by elements of the driven member 12, includes a circular wide-rimmed coupling member 20 provided with a narrow hub 22 securely fixed to a sleeve 24 which may be mounted upon and keyed to the shaft 26 of a prime mover 28 by means of a key 30 in keyways or slots 32 and 34 in the sleeve 24 and the shaft 26, respectively. Axial displacement between the shaft 26 and the driving unit 10 is prevented by a set screw 36 located at one end of the sleeve 24 and adapted to penetrate a depressed area or concavity 38 formed in the shaft 26.

The driven member 12 comprises a relatively thin walled cylindrical magnetic runner 40 carried at opposite ends by hub members 42 and 44 located on opposite sides of the coupling member 20, and journalled for rotation on the sleeve 24 by means of bearings 46 and 48, made of bronze or other suitable bearing material, which are preferably press-fitted into suitable hub holes 50 and 52, provided in the hub members 42 and 44, respectively.

The particular runner 40, illustrated, was made from an ordinary sheet steel can (such as used in canned foods) with the right end wall (Figure 1) cut off and a hole 54 cut in the left end wall 56 to fit the hub portion 58 of the member 42. The end wall 56 of the runner 40 is snugly fitted against and suitably secured to a circular flange 59 of the member 42, for example, by rivets 62. At its right end, the runner 40 is fastened by suitable means, such as rivets 64, to an outwardly extending rim 66 of the hub member 44, which is also provided with an annular groove 65 for receiving an O ring 67 to form an effective seal.

A shaft 68 serves as the output of the clutch and is provided with a key slot 70 for effecting a rigid connection with apparatus to be served by the shaft.

From an inspection of the drawing it will be apparent that the driven member 12 forms a sealed rotatable enclosure around the coupling member 20, thus to prevent dispersion and escape of the particles of magnetic material which normally is operatively disposed in the gap 16 formed between the working magnetic surfaces 72 and 74 of the driving and driven members, respectively. The magnetic material 14 may be particles of magnetic material such as iron, either alone or mixed with either wet or dry lubricants. The magnetic working surface 72 of the driving member is the peripheral surface around member 20, while the magnetic working surface 74 of the driven member is the inner cylindrical surface of the runner 40. Threaded filler holes 73 and plugs 75 therefor are provided in the hub member 44 for introducing and draining the magnetic particles.

In order to transmit torque between the driving and driven members, a magnetic field must be set up between the working surfaces 72 and 74, and through the gap 16 and the magnetic particles 14. This is accomplished by a relatively fixed magnetizing element 18 unattached to the driving or driven members and comprising an energizing coil 76 disposed in an inner annular channel 77 formed by two magnetic elements 78 and 80. The element 78 is a cylindrical yoke provided with an inwardly extending edge 82 at one end and mounting tabs 84 at the other end which are bolted to the frame 86 of the prime mover 28. The element 80 is a removable magnetic ring which forms one side of the channel 77 and is removably secured to the yoke 78 by a plurality of machine screws 88. Electric current, from a source not shown, is transmitted to the coil 76 by conductors 90 which pass through an aperture 92 formed in the ring 80 and through one of a plurality of apertures 94 provided in the yoke 78 to give convenient access to the set screw 96 without necessitating the removal of the yoke 78 from the frame of the prime mover. The respective sides 80 and 82 of the channel 77 form opposing magnetic poles when the coil is energized, thus providing a "horseshoe magnet" effect.

As seen in the drawing, the part of the runner 40 between the portions of the runner 40 opposite the pole faces of the poles 80 and 82 is a parallel magnetic path with respect to the main or operating magnetic circuit whose mean magnetic path is approximately indicated by the dotted line 96. In operation, when the magnetic circuit is excited upon energization of the coil, a relatively low ampere-turns field will readily pass through the runner 40 to act between the magnetic working surfaces, the gap therebetween and the magnetic particles therein, because, although made of magnetic material, the runner 40 is thin enough to saturate very easily, thus permitting the excess flux to pass through. Because of the thin construction and the quick saturation of the runner 40, it is a saturable bridge and a poor shunt to the magnetic circuit which, of course, is the desired characteristic. Thus it is obvious that the parallel magnetic path has a substantially smaller cross-sectional area than the area of the smallest cross-section of the magnetic path of the main magnetic circuit. Should the runner be relatively thick it would act as a shunt and enormous ampere-turns would be required to excite the complete magnetic circuit sufficiently to create the desired torque transmission. To prevent the shunting effects, a thick runner would have to be divided into two parallel magnetic portions (belts) separated by a nonmagnetic insulator. Such a construction, as pointed out hereinbefore, is expensive in design and manufacture and is not practical for many purposes. If such nonmagnetic insulator is a metal, such as aluminum or brass, the clutch is "slowed" up because the nonmagnetic metal member acts as a closed turn. If this member is nonmetallic, it is apt to weaken the clutch structure. Thus the saturable bridge feature of the present invention is advantageous in that it makes possible a runner with low inertia, unweakened by a split structure with a nonmagnetic insulator therein.

The thickness of the saturable bridge will be governed by the amount of ampere turns that are expendable before saturation of the bridge. The limiting factor on the thinness of the runner 40 is structural strength under static and dynamic conditions. A runner made from an ordinary sheet steel can with the average gauge of metal used in such cans has amazing strength in resisting deformation when subjected to the torque and torsional stresses occurring in such a clutch.

The dotted line 96 indicates the operating magnetic circuit which effectively passes through the gap 16 with more or less concentration in line with the effective poles (the edge 82 and the ring 80) of the magnetizing element 18. This indicates the comparative lack of shunting effect of the runner 40 due to its saturation characteristic.

While the form of embodiment of the invention as herein disclosed constitutes a preferred form, it is to be understood that other forms might be adopted, all coming within the scope of the claims which follow.

What is claimed is as follows:

1. A magnetic coupling device comprising a pair of spaced relatively rotatable inner and outer members, the outer member being a hollow cylinder forming a substantially sealed enclosure around the inner member, said outer member having a magnetic wall, said inner member having a magnetic portion spaced from said magnetic wall to define a magnetic working gap therebetween, magnetic particles in said gap and responsive to magnetic excitation for forming a torque transmitting bond between said members whereby rotation of one member at least tends to cause rotation of the other member, a stationary magnetizing element outside of said outer member having spaced apart opposite magnetic poles which are spaced from but in inductive relation to said magnetic wall, a main magnetic circuit including said magnetizing element, the portions of the magnetic wall opposite said poles, said gap with the magnetic particles therein and said magnetic portion of the inner member; and a saturable bridge comprising a part of said wall between the portions of the wall opposite the poles, said part being a parallel magnetic path with respect to the main magnetic circuit, said parallel magnetic path having a smaller cross-sectional area than the area of the smallest cross-section of the magnetic path of the main magnetic circuit, thereby forming a saturable bridge across the main magnetic circuit.

2. A magnetic coupling device comprising a pair of spaced relatively rotatable inner and outer members, the outer member being a hollow cylinder forming a substantially sealed enclosure around the inner member, said outer member having a cylindrical magnetic wall, said inner member having a magnetic portion substantially radially spaced from said wall to define a substantially radial magnetic working gap therebetween, magnetic particles in said gap and responsive to magnetic excitation for forming a torque transmitting bond between said members whereby rotation of one member at least tends to cause rotation of the other member, a stationary magnetizing element outside of said outer member having axially spaced opposite magnetic poles spaced from but in inductive relation to said wall, a main magnetic circuit including said magnetizing element, the portions of the wall opposite said poles, said gap with the magnetic particles therein and said magnetic portion of the inner member, said poles being adapted to direct flux substantially radially through said wall, and a saturable bridge comprising a circumferentially continuous part of said wall between the portions of the wall opposite the poles, said circumferentially continuous part being a parallel magnetic path with respect to the main magnetic circuit, said parallel magnetic path having a substantially smaller cross-sectional area than the area of the smallest cross-section of the magnetic path of the main magnetic circuit, thereby forming a saturable bridge across the main magnetic circuit.

3. A magnetic coupling device comprising a pair of spaced relatively rotatable inner and outer members, the outer member being hollow and forming a substantially sealed enclosure around the inner member, means for rotatably supporting said outer member at opposite ends thereof, said outer member having a cylindrical magnetic wall, said inner member having a magnetic portion substantially radially spaced from said wall to define a substantially radial magnetic working gap therebetween, magnetic particles in said gap and responsive to magnetic excitation for forming a torque transmitting bond between said members whereby rotation of one member at least tends to cause rotation of the other member, a stationary magnetizing element outside of said outer member having axially spaced opposite magnetic poles spaced from but in inductive relation to said wall, a main magnetic circuit including said magnetizing element, the portions of said wall opposite said poles, said gap with the magnetic particles therein and said magnetic portion of the inner member, said poles being adapted to direct flux substantially radially through said wall, and a saturable bridge comprising a circumferentially continuous part of said wall between the portions of the wall opposite the poles, said circumferentially continuous part being a parallel magnetic path with respect to the main magnetic circuit, said parallel magnetic path having a smaller cross-sectional area than the area of the smallest cross-section of the magnetic path of the main magnetic circuit, thereby forming a saturable bridge across the main magnetic circuit.

4. A magnetic coupling device comprising a pair of spaced relatively rotatable inner and outer members, the outer member being a hollow cylinder forming a substantially sealed enclosure around the inner member, said outer member having a magnetic wall, said inner member having a magnetic portion radially spaced from said wall to define a magnetic working gap therebetween, magnetic particles in said gap and responsive to magnetic excitation for forming a torque transmitting bond between said members whereby rotation of one member at least tends to cause rotation of the other member, a stationary magnetizing element outside of said outer member having axially spaced opposite magnetic poles and spaced from but in inductive relation to said wall, a main magnetic circuit including said magnetizing element, portions of said magnetic wall opposite said poles, said gap with the magnetic particles therein and said magnetic portion of the inner member, said poles being adapted to direct flux through said magnetic wall, and a saturable bridge comprising a part of said wall between the portions of the wall opposite the poles, said part being a parallel magnetic path with respect to the main magnetic circuit, said parallel magnetic path having a smaller cross-sectional area than the area of the smallest cross-section of the magnetic path of the main magnetic circuit, thereby forming a saturable bridge across the main magnetic circuit.

5. A magnetic coupling device comprising a pair of spaced relatively rotatable inner and outer members, the outer member being a hollow cylinder forming a substantially sealed enclosure around the inner member, said outer member having a cylindrical magnetic wall, said inner member having a magnetic portion substantially radially spaced from said wall to define a substantially radial magnetic working gap therebetween, magnetic particles in said gap and responsive to magnetic excitation for forming a torque transmitting bond between said members whereby rotation of one member at least tends to cause rotation of the other member, a stationary magnetizing element outside of said outer member having opposite magnetic poles axially spaced along said wall and spaced from but in inductive relation to said wall, and a main magnetic circuit including said magnetizing element the portions of the wall opposite said poles, said gap with the magnetic particles therein and said magnetic portion of the inner member, said poles being adapted to direct flux substantially radially through said wall, the part of the magnetic wall between said portions of the magnetic wall opposite said poles being magnetically in parallel with said main magnetic circuit and at least a portion of said parallel part being relatively thin to form a saturable bridge which saturates with ease as compared to the main magnetic circuit, said last mentioned portion being circumferentially continuous.

6. A magnetic coupling device comprising a pair of spaced relatively rotatable inner and outer members, the outer members being a hollow cylinder forming a substantially sealed enclosure around the inner member, means for rotatably supporting said cylinder at opposite ends thereof, said outer member having a cylindrical magnetic wall, said inner member having a magnetic portion substantially radially spaced from said magnetic wall to define a substantially radial magnetic working gap therebetween, magnetic particles in said gap and responsive to magnetic excitation for forming a torque transmitting bond between said members whereby rotation of one member at least tends to cause rotation of the other member, a stationary magnetizing element outside of said outer member having axially spaced opposite magnetic poles spaced from but in inductive relation to said magnetic wall, and a main magnetic circuit including said magnetizing element, the portions of the magnetic wall opposite said poles, said gap with the magnetic particles therein and said magnetic portion of the inner member, said poles being adapted to direct flux substantially radially through said magnetic wall, the part of the magnetic wall between said portions of the magnetic wall opposite said poles being magnetically in parallel with said main magnetic circuit and at least a portion of said parallel part being relatively thin as compared to the main magnetic circuit, thereby forming a saturable bridge having negligible shunting effects across said main magnetic circuit.

7. A magnetic coupling device comprising a pair of spaced relatively rotatable inner and outer members, the outer member being a hollow cylinder forming a substantially sealed enclosure around the inner member, said outer member having a cylindrical magnetic wall, said inner member having a magnetic portion substantially radially spaced from said magnetic wall to define a substantially radial magnetic working gap therebetween, magnetic particles in said gap and responsive to magnetic excitation for forming a torque transmitting bond between said members whereby rotation of one member at least tends to cause rotation of the other member, a stationary magnetizing element outside of said outer member having axially spaced opposite magnetic poles spaced from but in inductive relation to said magnetic wall, and a main magnetic circuit including said magnetizing element, the portions of the magnetic wall opposite said poles, said gap with the magnetic particles therein and said magnetic portion of the inner member, said poles being adapted to direct flux substantially radially through said magnetic wall, the part of the magnetic wall between said portions of the magnetic wall opposite said poles being magnetically in parallel with said main magnetic circuit and at least a portion of said parallel part being relatively thin as compared to the main magnetic circuit, thereby forming a saturable bridge having negligible shunting effects across said main magnetic circuit.

References Cited in the file of this patent

UNITED STATES PATENTS

| Number | Name | Date |
| --- | --- | --- |
| 1,233,569 | Graemiger | July 17, 1917 |
| 2,519,449 | Findley | Aug. 22, 1950 |
| 2,525,571 | Winther | Oct. 10, 1950 |
| 2,575,360 | Rabinow | Nov. 20, 1950 |

FOREIGN PATENTS

| Number | Country | Date |
| --- | --- | --- |
| 485,591 | Belgium | Nov. 13, 1948 |

OTHER REFERENCES

Technical Report 1213, National Bureau of Standards, Washington, D. C.